United States Patent [19]

Hemming et al.

[11] 4,108,596

[45] Aug. 22, 1978

[54] RECOVERY OF CHROMIUM VALUES FROM WASTE STREAMS BY THE USE OF ALKALINE MAGNESIUM COMPOUNDS

[75] Inventors: Donald C. Hemming, Whitesboro; Robert E. Hahn, Utica, both of N.Y.; John W. Robinson, Jr., Glen Mills, Pa.

[73] Assignee: Revere Copper and Brass, Incorporated, New York, N.Y.

[21] Appl. No.: 788,583

[22] Filed: Apr. 18, 1977

Related U.S. Application Data

[63] Continuation-in-part of Ser. No. 595,147, Jul. 11, 1975, abandoned.

[51] Int. Cl.$^2$ .................. C14C 3/06; C01G 37/00
[52] U.S. Cl. ...................... 8/94.27; 106/59; 423/36; 423/43; 423/106; 423/109; 423/146; 423/55; 423/57; 423/592; 423/597; 423/150
[58] Field of Search .............. 423/55, 57, 58, 544, 423/607, 596, 597, 36, 43, 106, 109, 146, 150; 106/59; 8/94.27

[56] References Cited

U.S. PATENT DOCUMENTS

| 747,255 | 12/1903 | Spence | 423/597 |
|---|---|---|---|
| 2,110,187 | 3/1938 | Williams | 423/607 |
| 2,766,101 | 9/1956 | Carosella et al. | 423/544 |
| 3,438,724 | 4/1969 | Hartford et al. | 423/596 |

FOREIGN PATENT DOCUMENTS

| 251,267 | 4/1927 | United Kingdom | 423/544 |
|---|---|---|---|
| 418,714 | 10/1934 | United Kingdom | 423/544 |

OTHER PUBLICATIONS

Patterson, "Technology and Economics of Industrial Pollution Abatement", I.I.E.Q. Document No. 76/72 (1976), pp. 69-126.

Udy, M., Chromium VRI., Reinhold Pub. Corp., N.Y., 1956, pp. 175-197, 277-279; 331.

Finholt, "Chemistry of Some Hydrolyzed Cr(III) Polymers", Ph.D. Thesis, U. Cal. 1960.

Harenberg, et al., "Chrome Recovery", in Das Leder, 25 (17), 11/74, pp. 219-222.

*Primary Examiner*—Brian Hearn
*Attorney, Agent, or Firm*—Pennie & Edmonds

[57] ABSTRACT

A process and a product formed thereby for the recovery of chromium values from aqueous solutions (e.g., waste liquors) comprises contacting an acidic solution containing sulfate ion and trivalent chromium ion with at least about 4 molar equivalents of MgO or Mg(OH)$_2$ per 3 molar equivalents of trivalent chromium in addition to the amount required to neutralize the free acid to a pH of about 4 to form an amorphous, dense solid, grainy, easily settleable, trivalent chromium-containing precipitate in an alkaline solution according to the equation: $3Cr_2(SO_4) + 8 MgO \rightarrow Cr_2(OH)_4SO_4 \cdot 4Cr(OH)_3 \cdot 4H_2O + 8 MgSO_4$. The trivalent chromium-containing product can be readily separated from the water and is a useful source of chromium for subsequent processing. The water remaining after separation of the precipitate contains less than 0.5 mg/l chromium.

7 Claims, No Drawings

RECOVERY OF CHROMIUM VALUES FROM WASTE STREAMS BY THE USE OF ALKALINE MAGNESIUM COMPOUNDS

CROSS-REFERENCE TO RELATED APPLICATION

This is a continuation-in-part of Ser. No. 595,147 filed July 11, 1975, now abandoned.

BACKGROUND OF THE INVENTION

Chromium containing solutions are widely used in a number of industrial processes such as chrome plating, wood preserving, tanning, textile dyeing, pigmenting and mordant operations. The residual solutions obtained therefrom contain chromium values which, up to the present, have been considered to be in a form which prevents their reuse or easy recovery. For these reasons manufacturers have, for many years, preferred to discharge these residual solutions into rivers, or municipal dumping areas. The discharge has been a source of severe water pollution. It is recognized that even small quantities of chromium are toxic to various forms of aquatic life. Governmental agencies are presently attempting to set permissible limits of less than 1 mg/liter of chromium in effluents discharged into waterways.

The amount of chromium lost through the present practice of discharging industrial effluents is substantial. For example, in tanning operations, about 30 to 50 percent of the chromium-containing materials used end up in the effluent. The recovery of these chromium values would aid in reducing our dependence upon foreign sources for this commodity.

The major industrial method presently used to remove chromium contaminants from waste water involves the reduction and precipitation of the chromium as hydrous chromic oxide. Precipitation involves neutralization of the solution with an inexpensive reagent such as lime, mixtures of lime and other metal oxides, alkali metal hydroxides or alkali metal carbonates. The process has several drawbacks. The hydrous chromic oxide formed is generally a gelatinous, slow settling mass which is hard to filter even under reduced pressure. The material peptizes readily above its isoelectric point of pH 5 and thus absorbs foreign cations which contribute to the filtering difficulties. Further, depending on its rate of precipitation, the particle size of the chromic oxide will vary. Finally, the hydrous chromic oxide formed is of an indefinite composition which is not readily redissolvable in acid, especially after aging. It therefore cannot be economically reused and, in itself, presents a storage and pollution problem.

A need therefore exists for an economic, non-polluting method of recovering chromium values from waste water streams in a form suitable for reuse of this valuable metal.

Accordingly, it is an object of the present invention to provide a process for treating chromium-containing waste water to recover the chromium values.

Another object is to provide a process for removing chromium values from waste waters in forms which are easily separated.

Another object is to provide a process for removing chromium values from waste waters in forms which are amenable to treatment to permit reuse of the chromium.

Yet another object is to provide a chromium composition which is readily capable of being treated to permit reuse of the chromium.

These and other objects can be had by reference to the following detailed description and claims.

SUMMARY OF THE INVENTION

The above objects are achieved according to the present invention by a process in which substantially all of the chromium values in a waste stream or liquor can be easily and efficiently recovered in the form of a precipitate. The product thus obtained is easily reusable in industrial processing and the resultant solution is substantially free of chromium.

The process comprises contacting an acidified aqueous solution (e.g., an effluent or waste stream) containing trivalent chromium sulfate with at least about 4 molar equivalents of a magnesium compound, namely, magnesium oxide or magnesium hydroxide, per 3 molar equivalents of trivalent chromium to form a final solution having a pH of 7 to 10. The chromium is precipitated as a basic chromic sulfate-hydrous chromic oxide composition, i.e., a chromium hydroxy sulfate. Under the aforesaid conditions the precipitation of chromium is essentially complete, leaving a residual mother liquor containing less than 0.5 ppm and generally from 0.1 to 0.4 ppm chromium.

The specific nature of the composition of the basic chromic sulfate-hydrous chromic oxide product of the invention is not well understood. However, it has been found by X-ray diffraction to be an amorphous solid; yet, it has the totally unexpected characteristic, not shared by the precipitates obtained with other alkaline reagents, of being a relatively dense, grainy (i.e., non-gelatinous), easily settleable material in a form which facilitates separation thereof from the spent solution or mother liquor. The material can be easily separated from the mother liquor by methods known in the art, including filtration and decantation. The precipitate formed is readily soluble in dilute acids, such as sulfuric acid, thereby permitting reuse of the recovered chromium values. Ageing of the precipitate has no adverse effect on the precipitate's acid solubility, a characteristic that facilitates the recovery and reuse of the chromium values of the waste stream as discussed hereinbelow.

The various alkaline materials heretofore used, such as calcium oxide, mixtures of calcium oxide and other oxides, alkali metal hydroxides, and the like, have the effect of hydrolyzing the chromium present to undesirable gelatinous hydrous chromic oxide. In the case of such previously used metal compounds, the hydroxyl ions cause the sulfate anions to remain completely ionized without being bound up as a complex with the chromium. This undesirable effect is believed to occur in the presence of excess hydroxyl ions which have a much stronger tendency to complex with chromium than sulfate ions. It should be noted that although a final gross pH of 7 to 10 can be attained with $Na_2CO_3$ or NaOH by exercising proper precautions, local excesses of hydroxyl ion occur momentarily. When this happens, a gelatinous hydrous chromic oxide is formed, which does not settle readily and which is extremely difficult to filter or redissolve.

It is a feature of the present process that magnesium hydroxide (or its precursor, magnesium oxide) has been unexpectedly found to cause the formation of the basic chromic sulfatehydrous chromic oxide precipitate of this invention to such an extent that the residual chromium content of the aqueous phase is less than 0.5 mg/l. This completeness of removal of chromium values from the aqueous phase and the formation of the amorphous, solid, grainy precipitate of the invention having the aforementioned properties of easy settleability and isolability have been discovered to occur only when the MgO or Mg(OH)$_2$ is used to the exclusion of other metal oxides or hydroxides, to neutralize the acidity of the starting solution to a final pH of from 7 to 10. The aforesaid magnesium compounds have been found to be capable of acting in this unique manner over wide variations in pH and trivalent chromium concentrations of the initial effluent solution. The pH of the effluent solution can range from about 1 to about 4 and can have a trivalent chromium content of from about 0.1 to about 20 grams per liter.

The trivalent chromium-containing effluent should have a pH of about 4 or less. The solution may be acidic due to the industrial process in which it was used or by which it is generated. In cases where the effluent does not contain sulfate ions to begin with, a source of soluble sulfate ions, e.g., sulfuric acid, sodium sulfate, potassium sulfate and the like, should be added. If the effluent solution contains any hexavalent chromium, it should initially be acidified with sulfuric acid (if necessary) and then reduced to the trivalent state by the addition of any well-known reducing agent such as sulfur dioxide, alkali metal bisulfite, and the like, as disclosed, for example, in U.S. Pat. No. 3,896,209 at column 1, lines 11–49, column 2, lines 1–41, and column 3, lines 11–49 and in U.S. Pat. No. 2,110,187 at column 2, lines 4–10, which are incorporated herein by reference.

The process of recovering chromium values from aqueous systems using magnesium compounds according to the present invention is desirably conducted at a temperature of between about 15° and 48° C. Operating temperatures in excess of 48° undesirably tend to increase the volume of the precipitate.

The amount of magnesium oxide or magnesium hydroxide necessary to practice the process and achieve the product of the present invention is that which is necessary to neutralize any free acid present and buffer the effluent solution plus at least 4 molar equivalents of MgO or Mg(OH)$_2$ per 3 molar equivalents of trivalent chromium. Preferably, a slight excess, e.g. 10% by weight, of magnesium compound is employed to hasten the process. The precipitate formed is a basic chromic sulfate-hydrous chromic oxide which is an amorphous but surprisingly solid, grainy, easily settleable material described herein and the remaining solution has a slightly alkaline pH, desirably between about 7 and 10, and preferably between 8 and 9. If desired, the precipitate can be washed with water and the latter removed, e.g., by suction filtration.

When 4 molar equivalents (over and above the amount required to neutralize or buffer the starting solution) of magnesium compound per 3 molar equivalents of trivalent chromium are used, the precipitate formed is free of magnesium. In other words, the invention achieves the important feature of taking advantage of the insolubility of the chromium-containing product and the solubility of magnesium ion to achieve a product which is essentially free of contamination with the reagent used in its formation. The precipitate can thus be readily reused for its chromium values exclusively. For example, the precipitate can be ignited (usually in an open vessel) at elevated temperatures, e.g., from about 800° C to 1300° C, to form a pure chromic oxide, $Cr_2O_3$, of pigment quality. The precipitate readily redissolves in inorganic acids, such as HCl, $H_2SO_4$, and the like, resulting in a concentrated acidic solution of trivalent chromium having a number of uses, e.g., in tanning processes and the like. The precipitate, when either dried or ignited, can also be fused at an appropriate temperature, e.g., 800°–1200° C, with an alkali metal carbonate, e.g., sodium carbonate, potassium carbonate, and the like, to form a mixture of alkali metal chromate and alkali metal dichromate which is useful as an anticorrosion agent as well as in other industrial applications well known to those skilled in the art.

A grainy, easily settleable precipitate can also be formed which contains magnesium oxide. This can be accomplished according to the present invention by adding the appropriate excess of magnesium compound over the stoichiometric amounts needed for neutralization and formation of the chromium precipitate of this invention. The excess can be up to about 10 equivalents of the magnesium compound per equivalent of trivalent chromium although greater amounts can be used if desired. Like the pure chromic sulfate-hydrous chromic oxide formed with a stoichiometric equivalent of magnesium compound, the mixed precipitate thus formed is a desired product for certain applications. Like the pure chromic sulfate-hydrous chromic oxide formed with a stoichiometric equivalent of magnesium compound, the mixed precipitate easily dissolves in acids and can be further processed or used in the same manner as described above. Further, the mixed precipitate, when ignited, forms a chrome magnesite ($Cr_2O_3$-MgO) composition which is a useful material in the brick and ceramic industries. The ratio of chromic oxide to MgO in the ignited product may vary from about 1:10 to about 10:1 by weight, the exact ratio depending on the specific end use.

The specific amount of magnesium compound to be added to the waste solution can be readily calculated by those skilled in the art after determining the composition of the waste solution. This determination can be done using a method of analysis which can be any procedure well known to those skilled in the art and such procedures are not considered a part of the invention.

If the waste solution contains, in addition to the chromium values, other heavy metals such as copper, nickel, zinc, and the like, these metal values will precipitate as basic sulfates along with the basic chromic sulfate-hydrous chromic oxide material of this invention. The chromium precipitate formed will contain these other metal values in the form of basic heavy metal sulfates. These materials do not alter the desirable solid, grainy, settleable characteristics of the precipitate. The chromium values can be separated from the other heavy metals by ignition of the mixed basic sulfate precipitate. The acid-insoluble chromic oxide can be separated from the acid soluble heavy metal oxides by sulfuric acid leaching. The chromium values can then be recovered by fusion with an alkali metal carbonate such as sodium carbonate to form an alkali metal chromate-dichromate.

DESCRIPTION OF THE PREFERRED EMBODIMENTS

The following examples are presented for purposes of illustration only and are not to be construed as limitations on the present invention except as set forth in the appended claims.

EXAMPLE I

A sample calculation is made which demonstrates the ability of magnesium oxide to neutralize an acidic effluent waste solution, yielding thereby a buffered system within the optimum pH of 7 to 10 and thus readily form the desired precipitate.

The calculations are made assuming a starting effluent pH of 1 (0.1 mole/l of H+) and a trivalent chromium concentration of 10 g/l (0.192 mole/l). The acid is neutralized according to the equation:

$$MgO + 2H^+ \rightarrow Mg^{++} + H_2O$$

2 g of MgO (0.05 mole) are therefore required to neutralize the acid present in the effluent. Further, if complete hydrolysis occurs, each mole of trivalent chromium present would produce one-and-a-half moles of magnesium ion in accordance with the formal equation:

$$Cr_2.6H_2O^{+++} + 3Mg(OH)_2 \rightarrow 2Cr(OH)_3.(H_2O)_3 + 3Mg^{++}$$

Therefore, the concentration of magnesium ion required to react with a 0.192 mole/l solution of trivalent chromium is 0.288 mole/l and the total magnesium ion concentration formed by neutralization and hydrolysis is 0.338 mole/l. The final pH is calculated as follows:

solubility product of $Mg[OH]^2 = 1.2 \times 10^{-11}$

Therefore, $$[.338] [OH]^2 = 1.2 \times 10^{-11}$$
$$[OH]^2 = 35.5 \times 10^{-12}$$
$$[OH] = 5.96 \times 10^{-6}$$
$$pOH = \log \frac{1}{5.96 \times 10^{-6}}$$
$$pOH = 5.23$$
$$pH = 8.77$$

To further illustrate the unique characteristic of magnesium oxide (as precursor for magnesium hydroxide) or hydroxide the above calculations were made with varying starting pH values and chromium concentrations. The results are given in Table 1, below.

TABLE 1

CALCULATIONS OF THE USE OF MAGNESIUM OXIDE AS A BUFFER IN THE CHROMIUM RECOVERY SYSTEM

| Run | Starting pH | Mg++ Concentration M/l Total | from Cr+++ Hyd. | From Neutralization | FINAL OH⁻ Concentration M/l | FINAL pOH | FINAL pH |
|---|---|---|---|---|---|---|---|
| A. Waste Chrome Liquor Concentration - 0.1 g/l | | | | | | | |
| 1 | 1 | 0.05288 | 0.00288 | .05 | $1.51 \times 10^{-5}$ | 4.82 | 9.18 |
| 2 | 2 | 0.00788 | 0.00288 | .005 | $3.91 \times 10^{-5}$ | 4.40 | 9.60 |
| 3 | 3 | 0.00338 | 0.00288 | .0005 | $5.98 \times 10^{-5}$ | 4.22 | 9.78 |
| 4 | 4 | 0.00293 | 0.00288 | .00005 | $6.4 \times 10^{-5}$ | 4.20 | 9.80 |
| B. Waste Chrome Liquor Concentration - 1.0 g/l | | | | | | | |
| 1 | 1 | 0.0789 | 0.0288 | .05 | $1.23 \times 10^{-5}$ | 4.91 | 9.09 |
| 2 | 2 | 0.0339 | 0.0288 | .005 | $1.88 \times 10^{-5}$ | 4.72 | 9.28 |
| 3 | 3 | 0.0294 | 0.0288 | .0005 | $2.02 \times 10^{-5}$ | 4.69 | 9.31 |
| 4 | 4 | 0.02885 | 0.0288 | .00005 | $2.04 \times 10^{-5}$ | 4.69 | 9.31 |
| C. Waste Chrome Liquor Concentration - 4.0 g/l | | | | | | | |
| 1 | 1 | 0.1651 | 0.115 | .05 | $0.865 \times 10^{-5}$ | 5.07 | 8.93 |
| 2 | 2 | 0.1201 | 0.115 | .005 | $1.0 \times 10^{-5}$ | 5.00 | 9.00 |
| 3 | 3 | 0.1155 | 0.115 | .0005 | $1.04 \times 10^{-5}$ | 5.00 | 9.00 |
| 4 | 4 | 0.1151 | 0.115 | .00005 | $1.04 \times 10^{-5}$ | 5.00 | 9.00 |
| D. Waste Chrome Liquor Concentration - 10.0 g/l | | | | | | | |
| 1 | 1 | 0.3381 | 0.288 | .05 | $5.96 \times 10^{-6}$ | 5.23 | 8.77 |
| 2 | 2 | 0.2931 | 0.288 | .005 | $6.40 \times 10^{-6}$ | 5.19 | 8.81 |
| 3 | 3 | 0.2886 | 0.288 | .0005 | $6.40 \times 10^{-6}$ | 5.19 | 8.81 |
| 4 | 4 | 0.2880 | 0.288 | .00005 | $6.40 \times 10^{-6}$ | 5.19 | 8.81 |
| E. Waste Chrome Liquor Concentration - 20.0 g/l | | | | | | | |
| 1 | 1 | 0.6281 | 0.578 | .05 | $4.38 \times 10^{-6}$ | 5.36 | 8.64 |
| 2 | 2 | 0.5831 | 0.578 | .005 | $4.55 \times 10^{-6}$ | 5.34 | 8.66 |
| 3 | 3 | 0.5786 | 0.578 | .0005 | $4.57 \times 10^{-6}$ | 5.34 | 8.66 |
| 4 | 4 | 0.578 | 0.578 | .00005 | $4.57 \times 10^{-6}$ | 5.34 | 8.66 |

EXAMPLE II

Chromium values were recovered from a copper pickling waste solution. The solution analyzed: 16.0 g/l copper, 7.7 g/l total Cr, 1.0 g/l hexavalent Cr, and 52.8 g/l sulfuric acid. $Na_2S_2O_5$ was added to reduce the hexavalent chromium. Seventy grams of MgO were added over a 1½ hour period to a 1-liter sample of the waste solution. The initial pH was 3.7 and the resultant pH was 8.6. The precipitate settled rapidly. After one hour the settled precipitate volume was 380 ml and remained constant over the next 24 hour period. The precipitate was easily separated from the solution by filtration. The filtrate contained 0.06 mg/l chromium.

EXAMPLE III

A 1-liter sample of the reduced waste pickling liquor described in Example II above was treated with 70 gms. of MgO over a five minute period. Agitation was maintained over a one hour period. The final pH was 8.9. The settled volume was 210 ml after one hour. No further settling was observed over a subsequent 24 hour period. The settled precipitate was vacuum filtered (3 inches Hg) completely within two minutes.

By way of comparison, two 1-liter samples of the same reduced pickling liquor were treated with sodium hydroxide and sodium carbonate, respectively, in the same manner as above. The sodium hydroxide treated solution was allowed to settle for 72 hours. The precipitate was gelatinous in appearance and had a volume of 910 ml. Flocculants were found not to improve the settling rate. Filtration was extremely slow, and total separation could not be achieved.

The sodium carbonate-treated solution yielded a settled volume of 550 ml after one hour. Filtration was extremely difficult. Here again, total separation could not be achieved.

EXAMPLE IV

One liter samples of a trivalent chromium solution (200 mg/l Cr) were treated with various precipitating agents to a final pH of 8.0 - 9.0. The solutions were stirred for ½ hour. The precipitate in each case was allowed to settle in order to determine the volume thereof. After re-stirring, the mixture was vacuum filtered (10 inches Hg). The filtration time for each solution is presented in Table 2, below.

Table 2

| Precipitating Agent | Settled Volume of Precipitate Slurry (ml) | Filtration Time (sec.) |
|---|---|---|
| MgO | <50 | 45–60 |
| $Na_2CO_3$ | 200 | 240–300 |
| NaOH | 400 | 660–720 |
| CaO | 240 | 360–420 |

The results in Table 2 illustrate the relatively high density of the settled precipitate slurry produced according to the present process compared to the corresponding densities of the precipitates obtained using other reagents.

EXAMPLE V

A 4-liter sample of exhausted tanning liquor containing 4.66 g/l Cr at a pH of 3.6 was filtered to remove skin fragments and other extraneous matter accumulated during processing. A quantity (21.6 grams) of MgO (10% by weight excess) was added with constant agitation. The resultant pH was 9.5 and a grainy precipitate rapidly formed and settled. The precipitate was easily vacuum filtered (3 inches Hg) and the filtrate contained 0.062 mg/l of Cr. The filter cake was transferred to a one liter container and was dissolved in $H_2SO_4$. The concentrated acidic chromium solution had a pH of 2.5 and a volume of 290 ml. The solution (evaporated to final volume of 233 ml) analyzed as 82.1 g/l Cr. and 1.2 g/l Mg.

EXAMPLE VI

A quantity (75 grams) of raw sheepskin was introduced into a ball mill together with 1.5 gm of sodium formate, 140 ml of a 10% brine solution and 10 ml of recovered chromium solution (equivalent to 1.1 g of $Cr_2O_3$) of EXAMPLE V, above. The ball mill was revolved for one hour. The pH was 2.5 at the end of this period. The chrome was set in the skin by adding 1.9 g of sodium bicarbonate in 5 portions over a 2 hour period. The final pH was 4.0 and the shrink temperature was 194° F, indicating a satisfactory tanned skin.

EXAMPLE VII

In this example, which illustrates the preparation of sodium chromate from the product of the present invention, an exhausted chrome tanning solution analyzing 4.28 gm/l trivalent chromium was treated with MgO. The precipitate formed was grainy, settled quickly and was easily separated from the solution by filtration. The precipitate was dried at 200° F, resulting in 10 grams of product containing 17 percent chromium.

A quantity (3 grams) of the product are mixed with 1 gram of sodium carbonate and fused at 1000° C. The amount of sodium chromate formed, was 1.5 g (1.59 g theoretical).

EXAMPLE VIII

A quantity (100 ml) of a stock solution containing 19.4 g/l Cr was treated with varying amounts of MgO. The products were filtered, washed, dried and ignited at 1000° C. The results are given in Table 4, below.

Table 4

| Product | Cr in Stock Soln. (g) | MgO used (g) | Analysis of Product MgO (percent) | Analysis of Product $Cr_2O_3$ (percent) |
|---|---|---|---|---|
| $MgO \cdot Cr_2O_3$ | 1.94 | 2.74 | 20.5 | 79.3 |
| $2MgO \cdot Cr_2O_3$ | 1.94 | 3.48 | 35.2 | 64.1 |
| $8MgO \cdot Cr_2O_3$ | 1.94 | 7.96 | 66.2 | 33.4 |

The resultant product is useful in brick and ceramic manufacture.

While the invention has been described in connection wih specific examples, it is not intended to limit the invention to the particular form set forth herein, but on the contrary, it is intended to cover such alternatives, modifications and equivalents as may be included within the spirit and scope of the invention as defined by the following claims.

We claim:

1. A process for the recovery of chromium values from an aqueous solution containing same, comprising:
   (a) contacting an acidic solution having a pH of up to about 4 and containing sulfate ion and containing trivalent chromium ion at a concentration of from about 0.1 to 20 grams of chromium per liter with an alkaline earth metal compound consisting essentially of a magnesium compound selected from the group consisting of magnesium oxide and magnesium hydroxide in an amount sufficient to neutralize the acidity of the solution to a pH of about 4 together with at least about 4 molar equivalents of said compound per 3 molar equivalents of trivalent chromium to form an amorphous solid, grainy, easily settleable chromium containing precipitate and a solution having a final pH of from 7 to 10; and
   (b) separating the precipitate formed in step (a) from the solution at a temperature of between about 15° and 48° C.

2. The process of claim 1 wherein the solution containing the chromium values is a waste liquor and about 4 molar equivalents of magnesium compound per 3 molar equivalents of trivalent chromium is used in excess of the amount required to neutralize said solution.

3. The process of claim 1 wherein hexavalent chromium present in the solution is initially reduced to trivalent chromium.

4. The process of claim 1 comprising additionally the steps of:
   (c) igniting the precipitate separated in step (b) to form $Cr_2O_3$; and
   (d) recovering the acid insoluble chromium oxide by fusion with an alkali metal carbonate.

5. The process of claim 4 wherein:
   the aqueous solution initially contains one or more dissolved heavy metal values selected from the group consisting of copper, nickel and zinc which are precipitated as basic sulfates in step (a) and separated along with the chromium-containing precipitate in step (b);
   the $Cr_2O_3$ formed in step (c) contains the acid-soluble oxides of said heavy metal values; and
   the acid soluble heavy metal oxide is separated from the acid-insoluble chromic oxide formed in step (c) by acid leaching.

6. The process of claim 1 wherein the magnesium compound is employed in an amount corresponding to that sufficient to produce an ignited product having a MgO-to-$Cr_2O_3$ ratio of from 1:10 to 10:1.

7. The process of claim 1 wherein the precipitate separated in step (b) is redissolved in sulfuric acid to produce a leather tanning solution.

* * * * *

UNITED STATES PATENT AND TRADEMARK OFFICE
CERTIFICATE OF CORRECTION

PATENT NO. : 4,108,596
DATED : August 22, 1978
INVENTOR(S) : Donald C. Hemming; John W. Robinson, Jr.

It is certified that error appears in the above-identified patent and that said Letters Patent are hereby corrected as shown below:

Column 2, line 65, "sulfatehydrous" should read
-- sulfate-hydrous -- .

Column 8, line 55, ":" should read -- ; -- .

Signed and Sealed this

Twenty-fourth Day of April 1979

[SEAL]

Attest:

RUTH C. MASON
*Attesting Officer*

DONALD W. BANNER
*Commissioner of Patents and Trademarks*